(12) United States Patent
Hansson et al.

(10) Patent No.: US 6,899,495 B2
(45) Date of Patent: May 31, 2005

(54) ROTATABLE TOOL FOR CHIP REMOVING MACHINING AND APPURTENANT CUTTING PART THEREFOR

(75) Inventors: Lars-Ola Hansson, Sandviken (SE); Christer Hoffman, Sandviken (SE)

(73) Assignee: Sandvik AB, Sandviken (SE)

( * ) Notice: Subject to any disclaimer, the term of this patent is extended or adjusted under 35 U.S.C. 154(b) by 140 days.

(21) Appl. No.: 10/291,666

(22) Filed: Nov. 12, 2002

(65) Prior Publication Data

US 2003/0103824 A1 Jun. 5, 2003

(30) Foreign Application Priority Data

Nov. 13, 2001 (SE) .............................................. 0103752

(51) Int. Cl.$^7$ .............................................. B23B 51/02
(52) U.S. Cl. ...................... 408/144; 408/226; 408/230; 408/232; 408/713
(58) Field of Search ................................ 408/144, 226, 408/227, 230, 713, 231, 232

(56) References Cited

U.S. PATENT DOCUMENTS

| | | | | | |
|---|---|---|---|---|---|
| 215,744 | A | * | 5/1879 | Heyn | 408/214 |
| 932,071 | A | * | 8/1909 | Urbscheit | 408/233 |
| 3,289,273 | A | * | 12/1966 | Artaud | 407/101 |
| 3,359,837 | A | | 12/1967 | Andreasson | |
| 5,769,577 | A | * | 6/1998 | Boddy | 408/231 |
| 5,904,455 | A | | 5/1999 | Krenzer et al. | |
| 5,957,631 | A | | 9/1999 | Hecht | |
| 6,059,492 | A | | 5/2000 | Hecht | |
| 2002/0057951 | A1 | * | 5/2002 | Silver | 408/1 R |
| 2003/0091403 | A1 | * | 5/2003 | Lindblom | 408/231 |

FOREIGN PATENT DOCUMENTS

| | | | |
|---|---|---|---|
| DE | 94340 | * | 9/1896 |
| DE | 384 720 | | 11/1921 |
| DE | 367 010 | | 1/1923 |
| DE | 32 30 688 | | 2/1984 |

* cited by examiner

*Primary Examiner*—Daniel W. Howell
(74) *Attorney, Agent, or Firm*—Burns, Doane, Swecker & Mathis, LLP

(57) ABSTRACT

A rotatable tool for chip removing machining includes two parts, viz. a holder part, rotatable around a geometrical center axis, and a replaceable cutting part, which is rigidly connectable to a front end of the holder part via a male/female coupling. The coupling includes a tapering seat in the holder part and a tapering male member, protruding rearwardly from the cutting part. In the seat, there is a slot, which separates two elastically deflectable projections, that may be inwardly deflected towards each other during clamping of the male member in the seat. The male member is elongated in a radial direction, and the seat is in the form of a radial groove into and out of which the sheath body is transversely movable. The male member includes a dove-tail shaped portion received in a dove-tail shaper portion of the groove. A centering button on the male member enters a depression in the holder part to axially center the cutting part.

30 Claims, 7 Drawing Sheets

ROTATABLE TOOL FOR CHIP REMOVING MACHINING AND APPURTENANT CUTTING PART THEREFOR

This application claims priority under 35 U.S.C. §§119 to Patent Application Ser. No. 0103752-2 filed in Sweden on Nov. 13, 2001, the entire content of which is hereby incorporated by reference.

TECHNICAL FIELD OF THE INVENTION

In a first aspect, this invention relates to a rotatable tool intended for chip removing or chip forming machining, which comprises two parts, viz. a holder part, mountable in a machine and rotatable around a geometrical center axis, as well as a replaceable cutting part, which is connectable to the holder part via a male/female coupling. The coupling includes on the one hand a seat having a shape tapering in the direction axially forwards, formed in a front end of the holder part, and on the other hand a male member, protruding from a rear end of the cutting part. Like the seat, the male member has an axially tapering shape. A slot is formed in the front end portion of the holder part, which separates two elastically deflectable or resilient projections the function of which is to clamp the male member of the cutting part in the seat. The cutting member in an area outside the male member features a rearwardly directed surface for the transfer of axial forces, and which co-operates with a surface for the transfer of axial forces on the forward end of the holder part.

PRIOR ART

Cutting tools of the type that makes use of a holder part or basic body, as well as a separate, replaceable cutting part, may in practice be of widely varying shapes and consist of, for instance, drilling tools, milling tools, such as endmills or slitting cutters, thread cutters, etc. The holder part usually consists of a long narrow shank of a cylindrical basic shape. In modern machine tools, the holder parts are so sophisticated and expensive that for economical reasons they cannot be integrated with the cutting part, which constitutes the wearing part of the tool. In other words, it is profitable to manufacture the actual cutting part as a separate, detachable unit (by those skilled in the art usually denominated "loose top"), which may be replaced after being worn-out, while the expensive holder part may be used for a longer period of time (usually 10 to 20 exchanges).

In practice, the loose top is entirely or partly manufactured from a hard, wear-resistant material, such as cemented carbide or the like, while the holder part is made of a material having a greater elasticity, e.g. steel. It should also be pointed out that tools of the kind in question are primarily—though not necessarily—intended for machining of workpieces of metal.

A tool of the initially generally mentioned kind is previously known from German Document No. 3 230 688-A1, more precisely the embodiment that is illustrated in FIG. 2 of that document. In that case, the male member on the cutting part consists of a genuinely conical pin that is axially movable in and out of a likewise conically shaped seat, which tapers off in the forward direction and opens axially in the front end of the holder part. The fact that the pin is conical and exclusively axially introducable in the seat means that the resilient projections have to be deflected substantially outwards in order to be able to receive the pin, a fact that, if at all practicable, means that the projections risk being plastically (i.e., permanently) deformed.

The actual clamping of the male member in the seat occurs thanks to the fact that the projections bend inwards with the help of a tensioning screw, which is in engagement with a female thread in a transverse hole in one of the projections and can rotate freely in a bore in the other projection. Furthermore, the tool concept according to DE 3 230 688 A1 is only shown in the form of a milling tool, i.e. a tool that lacks chip channels of the type that characterizes drilling tools. Therefore, the concept could not be successfully applied to drilling tools, in particular tools having small diameters, because the material between the seat and the individual chip channels would become very thin and weakened.

In U.S. Pat. No. 5,904,455, a drilling tool is disclosed, the holder part or shank of which in the front end thereof features a recess defined by two projections for receipt of a cutting part or loose top. Furthermore, a narrow slot is formed in the front-end portion of the holder part with the purpose of enabling elastic deflection of the projections. The two projections are formed with inwardly turned flank surfaces, which may be resiliently pressed against contact surfaces on the sides of the loose top, more precisely thanks to wedge surfaces being pressed into a V slot in the rear end of the loose top. The wedging is guaranteed by means of an axial screw within the holder part. A disadvantage of said tool is, however, that the loose top as well as the holder part has to be manufactured to a very high dimensional accuracy. Another disadvantage is that the tool demands dismounting from the appurtenant machine in order to enable manipulation of the axial screw in connection with exchange of the loose top.

A cutting tool is furthermore known from U.S. Pat. No. 5,957,631 (see also U.S. Pat. No. 6,059,492) said tool having a loose top that is clampable in a holder part formed with two resilient projections, the inherent elasticity of which is utilized in order to clamp the loose top. However, in this case, the loose top has to be manually turned between locking and releasing positions, something which on the one hand demands great force from the user, and on the other hand results in wear or a so-called embossing, which in the long term, impairs the ability of the holder part to center loose tops following each other in an exact way.

A rotary cutting tool is described in U.S. Pat. No. 5,769,577 in which a dovetail coupling is used between two components of the tool, that is to say a holder part and a drill unit. In that case the holder part does not however include any elastically bendable projections.

AIMS OF THE INVENTION

The present invention aims at obviating the above-mentioned drawbacks of the tool known from DE 3 230 688-A1 and at providing an improved tool. Thus, a primary aim of the invention is to provide a cuffing tool that may be realized not only in the form of a milling tool, but also other tools, such as drilling tools, whereby the resilient projections need not be deflected to such a large extent that they risk being plastically deformed.

An additional aim is to provide a cutting tool, the geometry of which in the interface between the loose top and the holder part is of such a nature that the holder part is not exposed to appreciable wear in connection with the exchange of loose tops; something which in turn should vouch for the holder part preserving a good ability to center and locate the individual loose top even after repeated exchanges of loose tops.

Another aim of the invention is to provide a cutting tool that can transmit great torques between the holder part and the loose top, even in those cases where the tool is formed with chip channels of the type that characterizes drilling tools.

Yet an aim of the invention is to provide a cutting tool that enables simple mounting and dismounting of the loose top without the holder part necessarily needing to be removed from a machine.

It is also an aim to provide a cutting tool, the two main parts of which, i.e., the loose top and the holder part, can be separately mass-produced in a simple and cost-effective way while guaranteeing a good centering of the loose top. Among other things, each one of the two parts should be able to be produced by means of simple machining operations and with a minimum of advanced grinding operations.

An additional aim is to create a tool which can depend exclusively on elasticity in both the projections on the holder in order to clamp the cutting part, that is to say without having to rely on any screw or other tensioning device for this purpose.

SUMMARY OF THE INVENTION

The invention is based on the idea of forming the seat in the holder part in the form of a sideways or radially opening guiding groove and the male member on the cutting part as a sheath like body, which can be fed into and drawn out sideways relative to the holder part. Thereby the sheath body shall be formed with one or more external wedge surfaces which are angled in relation to the center axis of the tool, said wedge surfaces being arranged to interact with an equivalent number of internal, angled wedge surfaces which limit the guiding groove, in addition the holder and cutting parts are to include interacting means to center the cutting part in a predetermined position in relation to the guiding groove. Furthermore the holder part is to include means for making possible bending of the projections in a direction away from each other in order to make it possible to mount respectively dismount the cutting part.

It is possible within the framework of the invention to maintain the cutting part clamped only with the help of the inherent elasticity in both the elastic projections which delimit the seat in the holder part, or with the help of a special tensioning device which in practice can take the form of a screw.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DESCRIPTION OF PREFERRED EMBODIMENTS OF THE INVENTION

Figure 1:
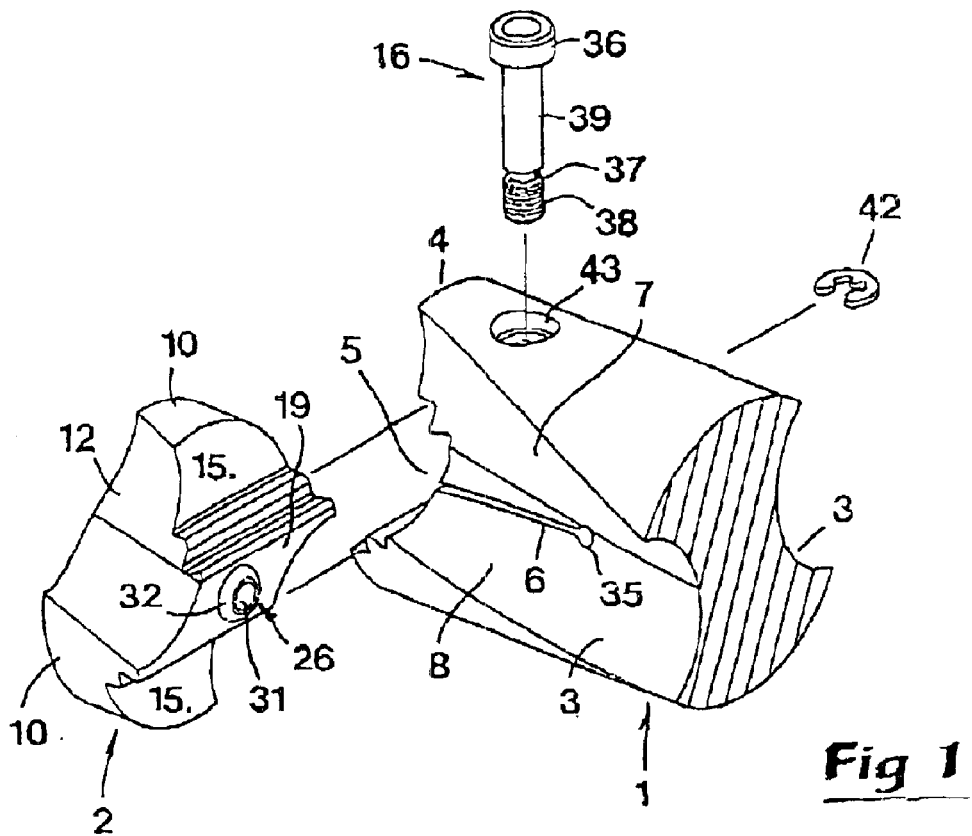
FIG. 1 is a perspective exploded view showing the main parts in a cutting tool according to the invention, viz. a loose top and a partially shown holder part.
Figure 2:
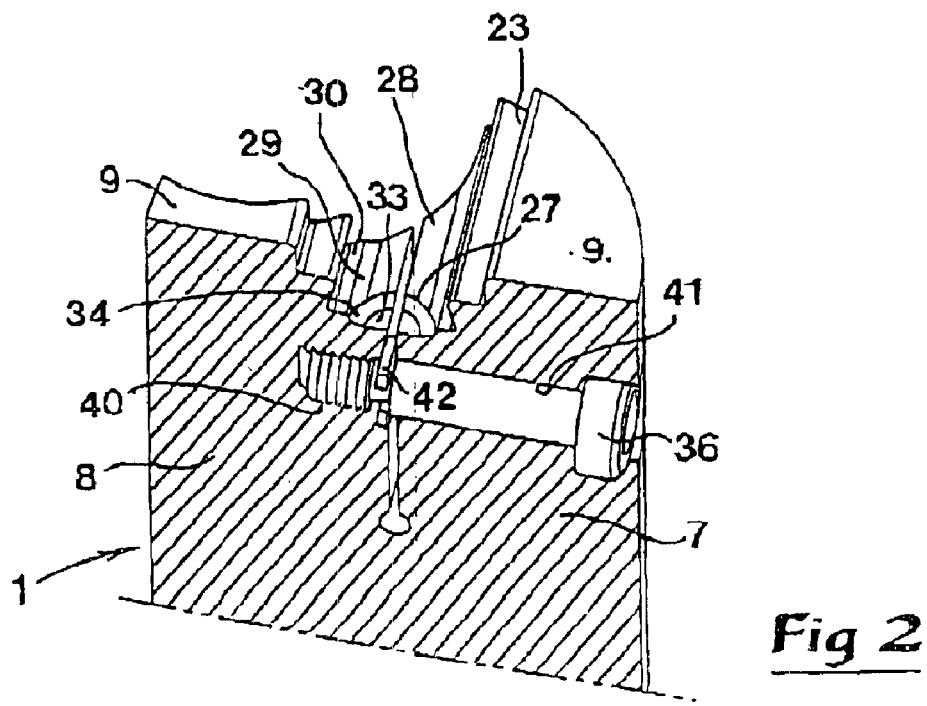
FIG. 2 is an axially cut perspective view showing a front end of the holder part with a tightening screw included therein.
Figure 3:
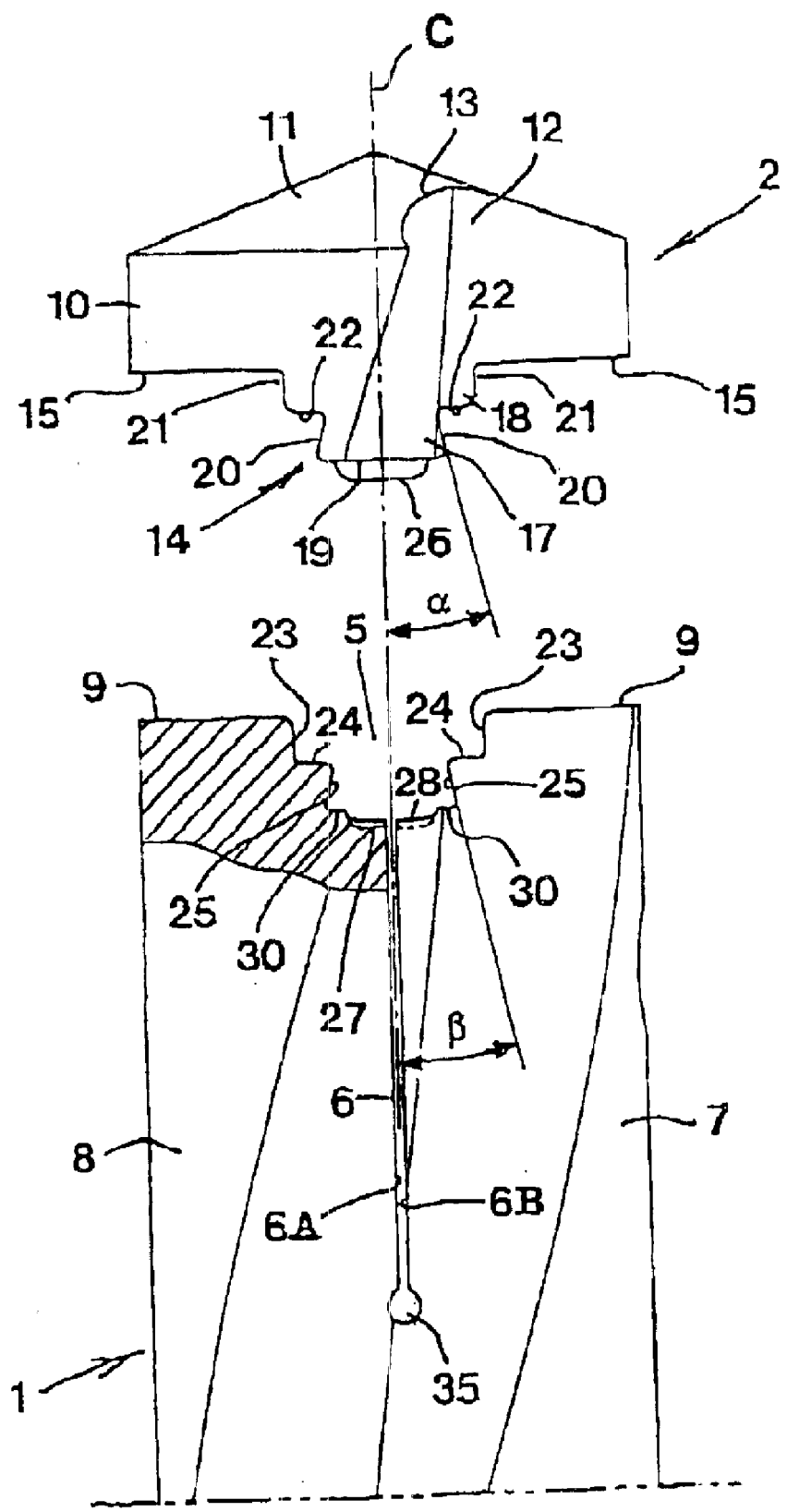
FIG. 3 is a partly cut side view showing the holder part and the loose top in a separated state.

The tool illustrated in FIGS. 1–6 is in the form of a drill, which in the usual way includes a holder part or basic body 1, as well as a replaceable cutting part or loose top 2. The holder part 1 consists of a long narrow shank of a cylindrical basic shape, which in FIGS. 1–3 is shown in a cut truncated state. The shank is in a suitable way mountable in a machine, e.g. a multi-operation machine, and has two helicoidal, cross-section-wise concavely curved chip channels 3. In a front end 4 of the holder part 1, a seat 5 is formed in which a slot 6 mouths (opens), which slot separates two elastically deflectable projections 7, 8. On both sides of the seat 5, there are thrust-carrying surfaces 9.

The loose top 2 is of a rotationally symmetrical basic shape in that it has a circular outer contour shape in connection with a substantially cylindrical or perhaps slightly rearwardly tapering (conical) envelope surface 10 as well as a conical surface 11 whose tip is directed forwards. In general, the loose top has a maximum diameter that is somewhat larger than the maximum diameter of the holder part 1. In the envelope surface, two concavely curved limiting surfaces 12 are formed that connect to the curved shape of the chip channels 3. In the front part of the loose top, cutting edges 13 are formed, which are shown schematically in the example in the form of edge lines between the cone surface 11 and the limiting surfaces 12. At the rear end thereof, the loose top 2 has a male member 14 for engagement with the seat 5. On either side of the male member 14, there are rearwardly facing thrust transmitting surfaces 15 for interaction with the surfaces 9 of the holder part.

In FIG. 3, C designates a geometrical center axis around which the composed tool is rotatable. Said center axis C should be common for the holder part 1 and the loose top 2 if the loose top is exactly centered in relation to the holder part.

The loose top 2 is made entirely or partly from cemented carbide or another wear-resistant material, while the holder part 1 is made of a material having a considerably greater elasticity, e.g. steel. Steel is preferable as a consequence of the inherent elasticity or flexibility thereof, which makes it possible to resiliently deflect the projections 7,8 that are spaced-apart by the slot 6. Such deflection is guaranteed in the embodiment according to FIGS. 1–6 by a clamping device in the form of a screw 16, the character of which will be described in detail below.

As far as the shown tool has been described hitherto, the same is in all essentials previously known from DE 3 230 688-A1.

Characteristic of the cutting tool according to the present invention is that the male member 14 consists of a radially elongated, i.e., sheath-like, body and the seat 5 of a radial, laterally open guiding groove into and out of which the sheath body is laterally—but in general not axially—movable. Another characteristic feature is that the sheath body 14 together with the guiding groove or holder part comprises means in order to center the sheath body in a predetermined position along the guiding groove. Said means will be described in closer detail below.

As is seen in FIG. 3, the male member 14 in the illustrated, preferred embodiment includes on one hand a cross-section-wise dovetail-shaped portion 17, and on the other hand a thickened neck portion 18 between the end surfaces 15 and the dovetail portion 17. The dovetail portion 17 is delimited on one hand by a rear end surface 19, and on the other hand by two wedge surfaces 20 converging forwards from the same, which wedge surfaces are inclined at an angle $\alpha$ to the center axis C. Said two wedge surfaces 20 may advantageously be plane, although it is feasible per se to completely or partially design the same with a slightly curved, e.g., slightly concavely curved shape. The end surface 19 may be plane. However, alternatively, even the end surface may also be curved, e.g., convexly curved.

The neck portion 18 is delimited on one hand by two opposite flank surfaces 21, which in the example are plane and mutually parallel, and on the other hand by two first transverse surfaces 22, which may be plane, extending radially inwards towards the wedge surfaces 20. In this connection, it should also be mentioned that the thrust-transmitting end surfaces 15 on both sides of the sheath body 14 in the example are plane and extend perpendicularly to the center axis C. Further it should be pointed out that even the guiding groove 5 extends at a right angle to the center axis and radially in relation to the same.

Advantageously—though not necessarily—the side limiting surfaces 20, 21 of the sheath body are symmetrical in relation to the center line C, i.e. the plane and mutually parallel surfaces 21 are located at equally large radial distances from the center line C. In an analogous way, the wedge surfaces 20 are located at equally large distances from the center axis and inclined at the same angle $\alpha$ to the center axis. The angle $\alpha$ may per se vary most considerably, but should be within the range of 5–25°, suitably 10–20°. In the example, the angle $\alpha$ amounts to 15°.

The guiding groove 5 is of a cross-section shape that generally—but not exactly—corresponds to the cross-section shape of the sheath body 14. Thus, an outer space in the guiding groove is defined by two internal side-limiting surfaces 23, which in the example are plane and mutually parallel. Said surfaces 23 are intended to interact with the flank surfaces 21 on the sheath body 14. Inwards from the side limiting surfaces 23, a pair of second transverse surfaces 24 extend, which transform into two second wedge surfaces 25, which like the first wedge surfaces 20 are inclined and converge in the forward direction. Said two internal wedge surfaces define an inner space or bottom space in the guiding groove. The angle of inclination $\beta$ of the internal wedge surfaces 25 may advantageously differentiate from the angle $\beta$, more precisely in such a way that the angle $\beta$ is somewhat smaller than the angle $\alpha$. The angle $\beta$ may, for instance, be about 0.5–5°, suitably 1–2° smaller than the angle $\alpha$. Because of the angle $\alpha$ being larger than the angle $\beta$, contact between the interacting pairs of wedge surfaces will be established as deeply as possible inside the guiding groove, that is to say, the points of contact between the wedge surfaces will be located in immediate proximity of the bottom of the guiding groove. More precisely, the rear portions of the wedge surfaces 20 and 25 will be brought to contact with each other while there will be created a diverging clearance between the surfaces 20, 25 forward from the contact places.

Like the surfaces 15, the two forwardly facing surfaces 9 on both sides of the guiding groove 5 are plane and extend perpendicularly to the center axis C.

Figure 6:
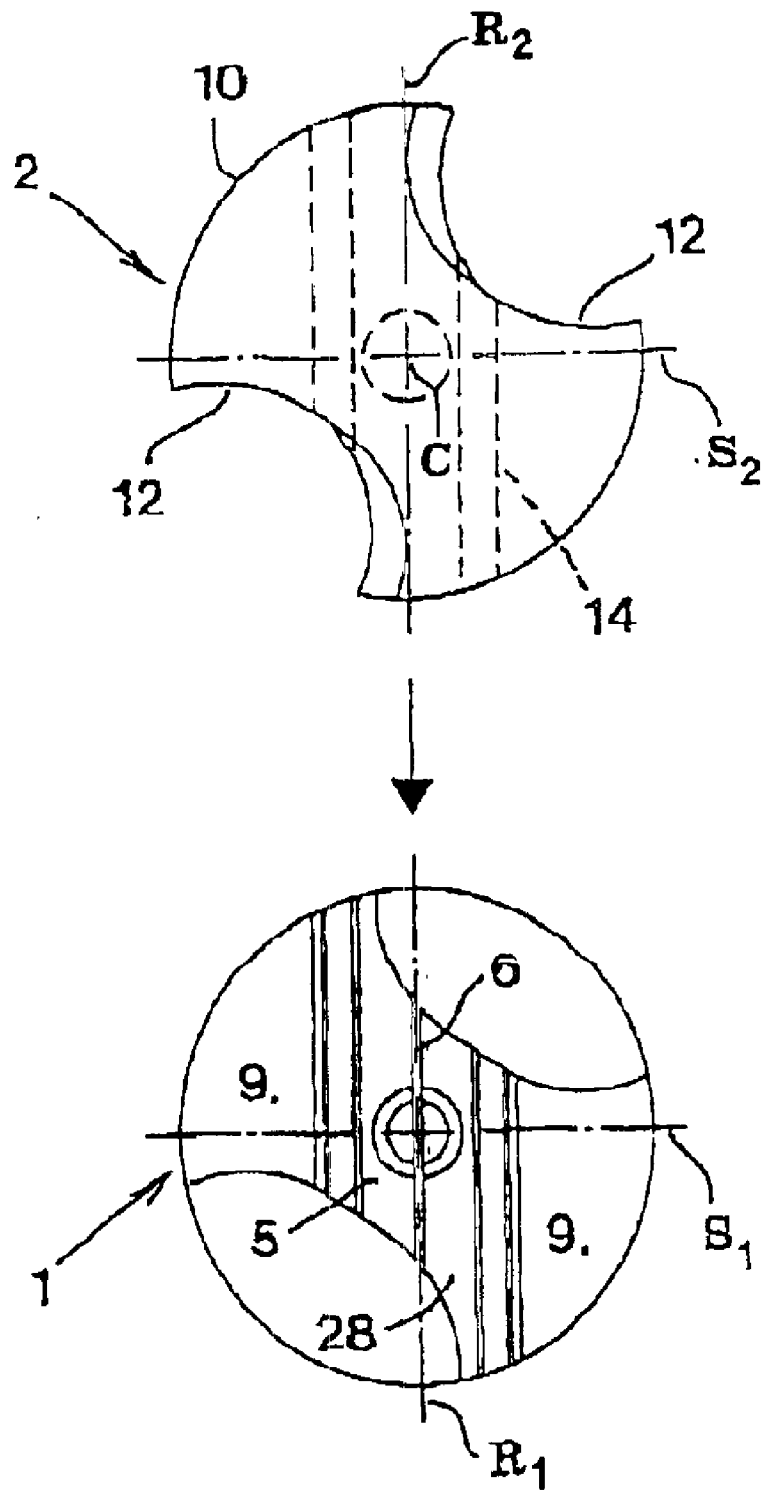
FIG. 6 is an exploded view showing end views of the loose top and the holder part in a separated state.

Reference is now made to FIG. 6, which illustrates how the guiding groove 5 in the holder part 1 extends radially in a radial plane designated $R_1$ through the center axis C. The sheath body 14 on the loose top 2 extends in an analogous radial plane $R_2$. Secondary planes extending perpendicularly to the planes $R_1$ and $R_2$ and intersecting the center axis C are designated $S_1$ and $S_2$, respectively.

In the illustrated, preferred embodiment, the radial plane $R_1$ is common for the guiding groove 5 and the slot 6, i.e. the slot 6 extends in a radial direction parallel to the side limiting walls 23, 25 of the guiding groove. Furthermore, the guiding groove in the example according to FIGS. 1–6 is open at the opposite ends thereof. In this way, the sheath body 14 may be inserted into the guiding groove from either side of the holder part, and be drawn out in an arbitrary direction, respectively.

Now, reference is again made to FIGS. 1–3, which illustrate how the means for centering the cutting part 2 in relation to the holder part 1 comprises a button head protrusion 26 formed in one of the parts (FIGS. 1 and 3) and a countersink 27 (FIG. 2) in the other part. In the preferred embodiment, the button head protrusion 26 is formed on the end surface 19 of the sheath body 14. The button head protrusion 26 is of a rotationally symmetrical basic shape and is suitably—though not necessarily—placed at the center of the end surface 19, i.e., in the point where the radial planes $R_2$ and $S_2$ intersect each other.

The countersink 27 is recessed in a bottom surface 28 of the guiding groove 5. In the example, said bottom surface 28 is plane and transforms via concavely arched or rounded transition surfaces 29 into plane recess surfaces 30, which in turn connect to the internal wedge surfaces 25. Like the button head protrusion 26, the countersink 27 is of a rotationally symmetrical basic shape, whereby the countersink suitably—though not necessarily—is placed centrally along the bottom of the groove surface 28 so that the center of the countersink 27 coincides with the center axis C.

The rotationally symmetrical shape of the button head protrusion and the countersink, respectively, may vary. In the example, the button head protrusion 26 is delimited by on the one hand a plane end surface 31, and on the other hand a convexly curved, circumferential envelope surface 32. In an analogous way, the countersink 27 is defined by a plane bottom surface 33 and a concavely curved, circumferential cup surface 34. The button head protrusion is shallower than the countersink so that the same cannot touch the bottom of the countersink, whereby the button head protrusion may have a somewhat larger diameter, e.g. a 0.05 mm larger diameter than the countersink. In this way, it is guaranteed that the contact between the surfaces 32, 34 at least theoretically will consist of a line contact, more precisely a circumferential circular line, when the button head protrusion engages the countersink. Because the slot 6 intersects the countersink, the countersink 27 limits the slot by two substantially semi-circular recesses in the bottom of the groove.

In FIGS. 1–3, the holder part 1 is shown in a tensionless state in which the two projections 7, 8 on each side of the slot 6 assume an exit or neutral position. In the example shown, the two surfaces 6A, 6B that define the slot are plane, the same being mutually parallel when the projections are in the neutral position. In this connection, it should be mentioned that the slot 6 extends from the bottom surface of the groove 28 to a through hole 35 that facilitates the deflection of the projections. The axial length of the slot should amount to at least 0.8 times the diameter of the holder part 1, but may also advantageously be larger, e.g., within the range of 1–2 times the diameter. From said neutral position, the projections 7,8 may be deflected outwards as well as inwards (inward deflection is only possible as long as the loose top is not mounted), more precisely by means of the screw 16 serving as clamping device.

The screw 16 intended for deflection of the projections is double acting in the manner described below.

Figure 4:
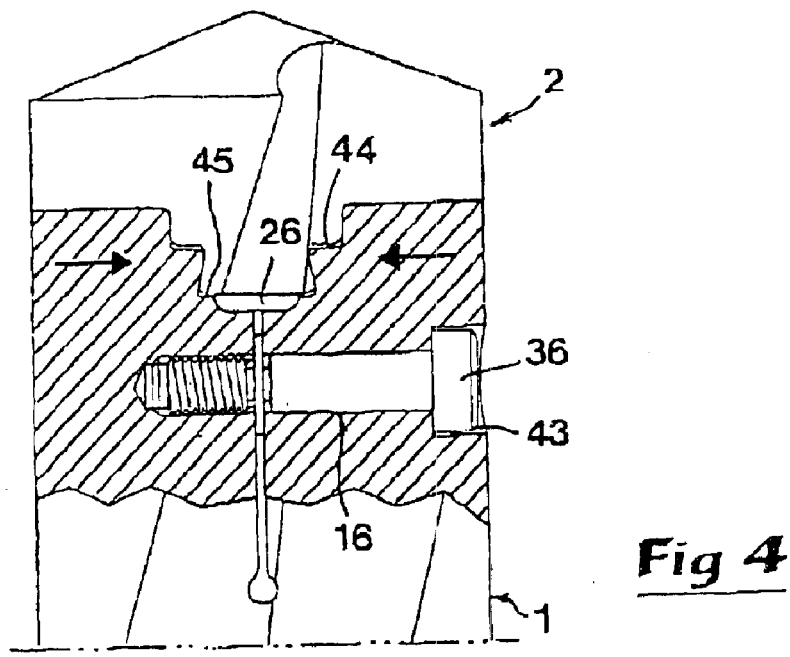
FIG. 4 is a partially cut side view showing the loose top in a mounted and clamped state.
Figure 5:
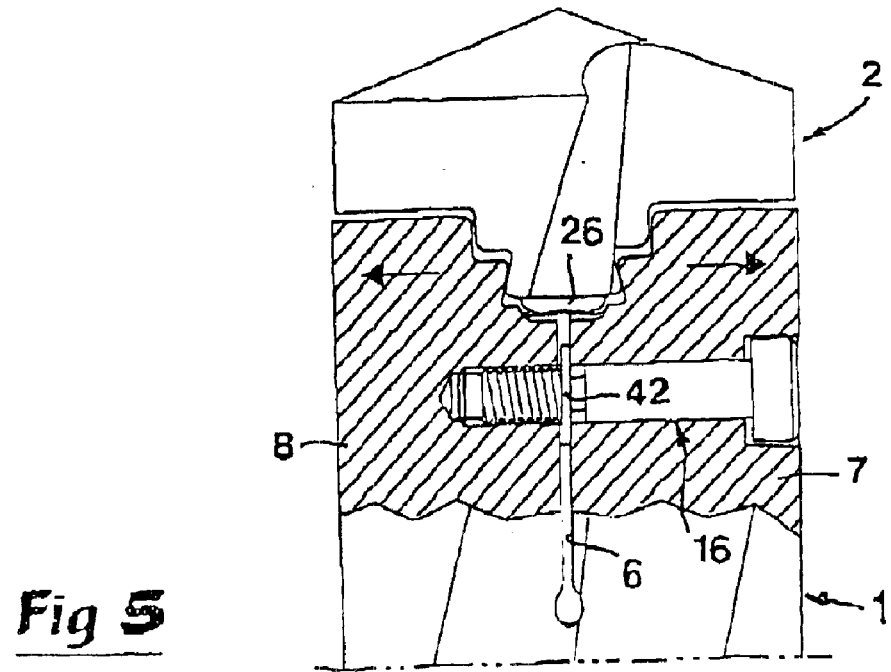
FIG. 5 is a corresponding side view showing the loose top and the holder part during mounting/dismounting of the loose top.

As is seen in FIGS. 1 and 2, the screw includes a head 36 and a shank having a waist 37 that separates a male thread 38 from a smooth section 39, on the end of which the head is formed. The male thread 38 is in engagement with a female thread 40 in the projection 8, while the smooth section 39 is freely rotatable in a non-threaded bore 41 in the projection 7. Via the slot 6, a split retainer ring or washer 42 or the like is applied on the waist 37. When the screw is tightened, i.e., the male thread 38 is screwed in the direction inwards in the female thread 40, the pressure washer is 42 inactive, the projections 7,8 being provided with a tendency to be inwardly deflected towards each other, as is shown in FIG. 4. When the male thread 38 is unscrewed from the female thread by rotation of the screw in the opposite direction, the washer 42 will be pressed against the limiting surface 6B of the slot 6 and cause the two projections to be separated from each other, as is shown in FIG. 5. In this connection, it should be pointed out that the deflection motions of the projections may in practice be highly limited. In drills having a diameter of, for instance, 16 mm, the slot 6 may have a width of 0.24 mm, whereby the deflection outwards of the projections from the neutral position amounts to 0.05 mm in the area of the bottom of the groove 28.

The head 36 of the tightening screw 16 is housed in a countersink 43 in one side of the holder part. In other words, the screw does not protrude from the envelope surface of the holder part. It should also be pointed out that the screw 16 advantageously is radially positioned, i.e. located in the radial plane $S_1$, and extends perpendicularly to the slot 6.

Advantages of the Tool According to the Invention

When a loose top 2 is to be connected to the holder part 1, the two projections 7,8 are deflected outwards from each other (see FIG. 5) in the manner described previously by means of the tightening screw 16. In this connection, the guiding groove 5 is widened so that the dovetail portion of the sheath body can be inserted without obstacle into the bottom space of the guiding groove, i.e., between the internal wedge surfaces 25. In this connection, the sheath body may be located at a certain axial distance from the bottom of the groove. In this way, the plane end surface 31 of the button head protrusion 26 may slide along the bottom surface 28 of the groove without any resistance to insertion of the sheath body arising. When the button head protrusion 26 reaches the countersink 27, the same automatically engages the countersink and is centered in the same. When this is effected, the tightening screw 16 is tightened. In doing so, the two projections 7,8 will be deflected inwards towards each other to the aforementioned neutral position. During this inwardly deflection of the projections, the sheath body will be drawn successively rearwards into the guiding groove by interaction between the pairs of wedge surfaces 20,25. A wedge action simply arises, pulling the sheath body axially into the guiding groove with a certain force until the surfaces 15 of the loose top 2 have been pressed into close contact against the surfaces 9 of the holder body. Further tightening of the tightening screw when the projections have reached the neutral position entails that the surfaces 23 of the projections are pressed into close contact against the flank surfaces 21 and clamp the sheath body with a considerable force during exact centering of the loose top, more precisely in the radial planes $S_1$ and $S_2$.

In connection with the tightening of the tightening screw, the button head protrusion 26 is of course also pressed axially into the countersink 27 and centered in the radial planes $R_1$ and $R_2$ by the circumferential line contact that is established between the external envelope surface 32 of the button head protrusion and the internal cup surface 34 of the countersink. Due to the fact that the button head protrusion is shallower than the countersink, the plane end surface 31 of the button head protrusion will never come into contact with the plane bottom surface 33 of the countersink. As is seen in FIG. 4, neither of the two transverse surfaces 22 of the neck portion 18 will come into contact with the two corresponding transverse surfaces 24 of the guiding groove. On the contrary, a distinct play or gap 44 is maintained between said surfaces. Also between the plane end surface 19 of the sheath body and the two recess surfaces 30, a play 45 is maintained. However, as has been pointed out above, the two external flank surfaces 21 of the neck portion 18 and the corresponding internal side limiting surfaces 23 in the guiding groove are pressed in close contact against each other. In the illustrated embodiment, the transmission of torque is carried out between the holder part and the loose top essentially via said pair of surfaces 21, 23. As is best seen in FIG. 2, the side limiting surfaces 23 are located at a comparatively large radial distance from the center of the holder part. This means that the surfaces 23 can be given a greater length and, thereby, achieve an improved surface abutment than if they were situated closer to the center of the holder part, where the part of the holder part defined between the chip channels 12 is thinner.

When a worn out loose top is to be removed, the procedure is reversed, i.e., the tightening screw 16 is unscrewed a distance from the appurtenant female thread, whereby the projections 7,8 are deflected out to the outer end positions thereof in which the guiding groove is maximally widened. After this, the centering button head protrusion 26 may be led out of the countersink 27 and the sheath body may be pulled out of the guiding groove towards either side.

Figure 7:
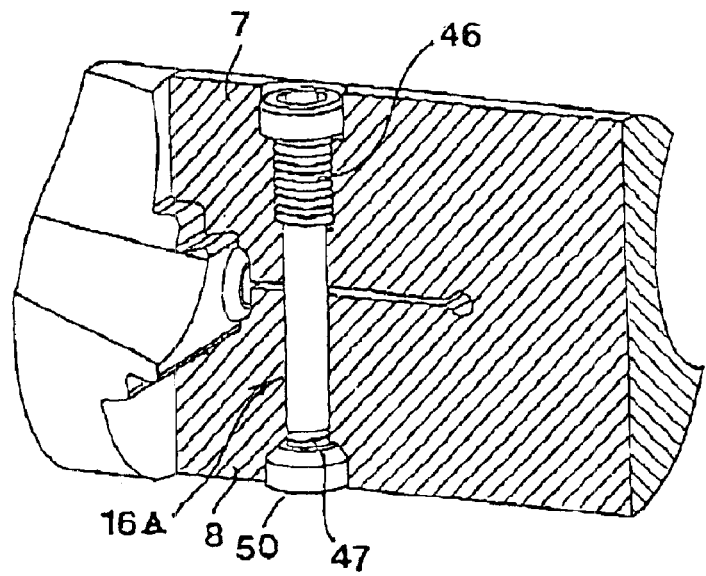
FIG. 7 is a perspective cut view showing an alternative embodiment of a tightening screw for the tool.
Figure 8:
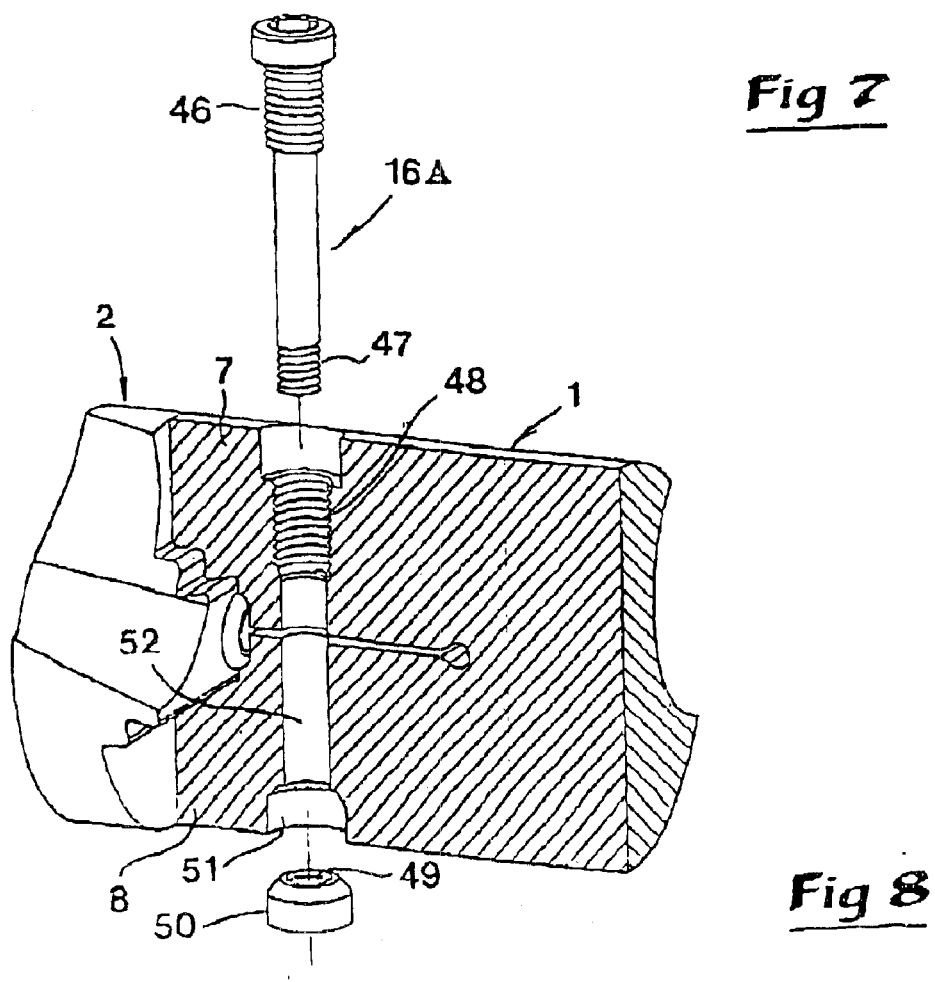
FIG. 8 is an exploded view showing the tightening screw according to FIG. 7 separated from the tool.

In FIGS. 7 and 8, an alternative embodiment of a tightening screw 16A is shown. Like the previously described tightening screw, said screw includes a shank and a head. At one end of the shank, a first male thread 46 is formed, which is either left-hand threaded or right-hand threaded. In the example, it is assumed that the same is left-hand threaded. At the opposite end of the shank, a second male thread 47 is formed having the opposite type of thread pitch, viz. right-hand threaded. The male thread 46 is in engagement with an analogous, i.e. left-hand, threaded female thread 48 in one of the projections 7. The other male thread 47 is in turn in engagement with an analogous, i.e., right-hand, threaded female thread 49, which is included in the other projection 8. In this case, the female thread 49 is formed in an insert ring 50 that is inserted into a widened hollow space 51 in the extension of the through bore 52 through which the screw extends. Following insertion into the space 51, the ring 50 is rigidly locked in relation to the projection 8, e.g. by means of a cotter pin (not shown).

When the screw 16A is rotated in one of the directions of rotation, more precisely in such a way that the male thread 46 moves inwards in the female thread 48, the opposite male thread 47 will work in the same way, i.e., move inwards in the appurtenant female thread 49. This means that the two projections 7,8 are deflected in the direction radially inwards towards each other. At rotation of the screw in the opposite direction, the male threads 46,47 will move in the direction out from the appurtenant female threads 48, 49, which results in the projections 7,8 becoming deflected in the direction outwards away from each other.

In the embodiments described above and those illustrated in FIGS. 1–8 the bending of both projections 7,8 outwards is achieved with the help of a tensioning device in-built in the holder and which is in the form of a screw which even has the function of actively tensioning both the projections against the loose tops male member sheath body.

Figure 9:
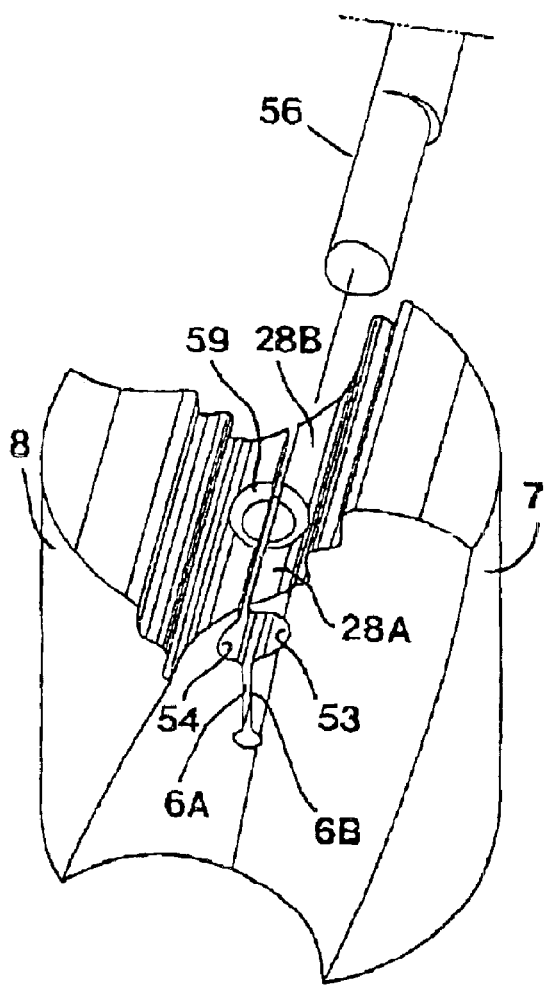
FIG. 9 is a perspective view showing a front end of a holder part according to an alternative embodiment of the tool according to the invention, whereby in connection to the holder part there is shown a key to be used to bend the two projections in the holder part outwards.
Figure 10:
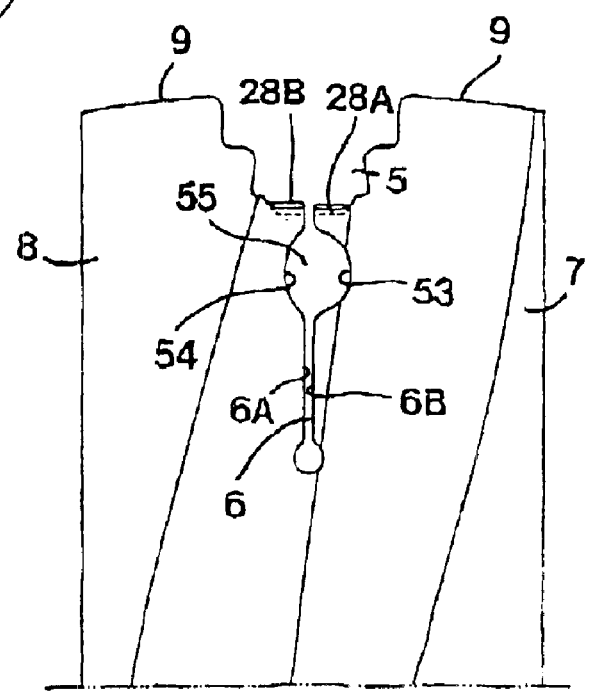
FIG. 10 is a side view of the holder part according to FIG. 9.
Figure 11:
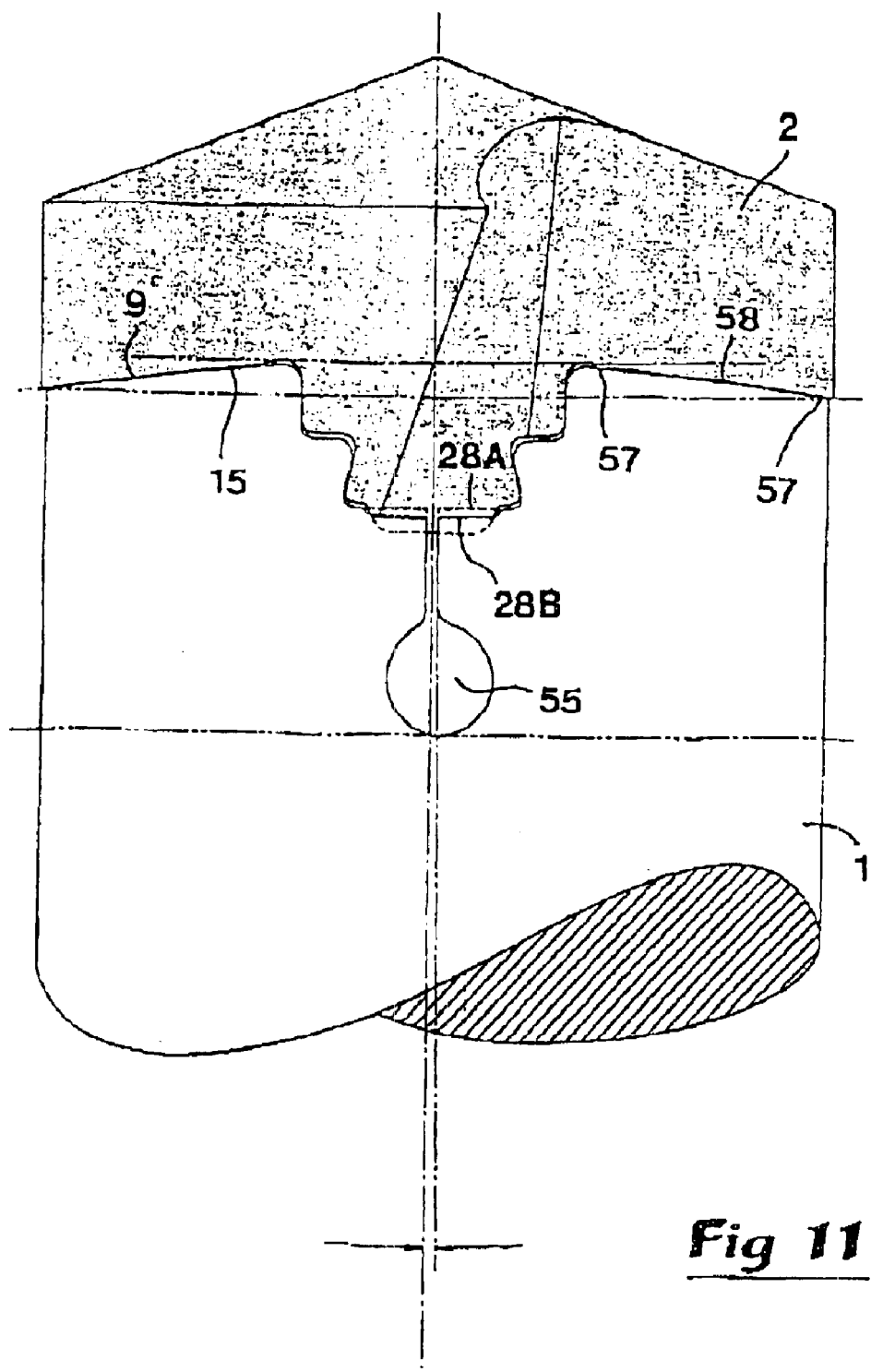
FIG. 11 is a further enlarged side view showing the holder part with a loose top mounted.

An alternative embodiment of a tool is shown in FIGS. 9–11. That tool differs fundamentally from that described above in that the holder part lacks all form of active tensioning device for the clamping of the loose top. Thus in the embodiment according to FIGS. 9–11 only the inherent elasticity of the projections 7,8 is used primarily in order to hold fast the loose top. In order to make possible the outward flexing of the projections, recesses 53,54 are formed in both of the surfaces 6A,6B which delimit the slot 6 and which together delimit an oval hole 55, which to advantage, but not necessarily, can be a through hole and extend at right angles to the center axis of the tool. A separate key 56 with an oval cross section can be inserted in this hole 55, said key causes the projections 7,8 to be force apart (e.g., by 0.05 mm) so that the sheath body can be slid into, or drawn out of, the guiding groove.

The recess 53 has a substantially half-circular shape in the example shown whereas the other recess 54 has a half-oval or shallow arched shape. The shape of the recesses and hence also that of the hole 55 can vary widely within the scope of the invention. Theoretically it is therefore thinkable to form a recess for an oval key in just one of the surfaces 6A, 6B. It should also be noted that the hole 55 is placed at a maximum distance from the hole 35 at the bottom of the slot 6. In this manner maximum leverage is obtained in conjunction with the turning of the key 56.

A further difference between the embodiment according to FIGS. 9–11 and the embodiment described earlier is that the axial support surfaces 9 (which form separate surfaces on either side of the guiding groove 5) are angled in relation to the center axis of the holder part. More exactly the surfaces 9 are angled so that they diverge rearwardly and form an obtuse angle the point (apex) of which is directed forwards. In the shown example, the individual surface 9 is angled by approximately 86° in relation to the center axis, and as a result the obtuse angle mentioned above will be 172°. This angle can of course be larger or smaller. As can be seen in FIG. 11, the interacting surfaces 15 on the rear of the cutting part 2 are angled at a corresponding obtuse angle, whereby the surfaces diverge in the rearwards direction. The effect of the interacting pairs of surfaces 9,15 being angled in the manner described is that the rear surfaces 15 on the cutting part apply a thrust component onto the front surfaces 9 on the holder part. During operation that thrust tends to bend the projections 7,8 inwards in such a manner as to further contribute to the clamping of the sheath body in the guiding groove (in addition to the spring force which is created by the inherent elasticity of the projections).

In accordance with the preferred embodiment of the invention at least one of the two surfaces 9,15 which interact in a pair have a cambered or convex arched shape. Arching of a surface in this manner can occur along the entire surface or just part of a surface. If only one of the two surfaces 9,15 is arched and the other is flat, the surface 9 should be shaped with the arched part, because a shape of this sort lends itself to being formed by a simple means in the holder part which is manufactured in steel. By cambering or arching at least one of the surfaces in this manner, clearances 57 are achieved on either side of the contact point 58.

In the embodiment according to FIGS. 9–11 the bottom of the guiding groove is formed with two partial surfaces 28A, 28B which are situated at different levels, as can be clearly seen in FIG. 10. That is, the surface 28B is closer to the front end of the holder than is the surface 28A. These two partial surfaces are separated by a recess 27 of the same type as has been described previously. In practice, the differences in level between the surfaces 28A, 28B can vary slightly and be of the order of for example 0.1–0.3 mm. But even so, the difference in level leads to the formation of a shoulder 59 in connection to the right hand partial surface 28B. In the shown example, the shoulder 59 is formed by the far part of the cup surface 34 which is connected to the partial surface 28B which is to be found furthest from the observer in FIG. 9.

When the sheath body 14 of the cutting body as described previously is slid into the guiding groove, the button head protrusion 26 will come into contact with the shoulder 59, whereby the button head protrusion stops against the shoulder. In this manner the final mounting position of the sheath body and cutting part is determined in a distinct and exact way. In other words the shoulder forms a means for centering the cutting part in relation to holder part.

In this connection it should be pointed out that the sheath body in the embodiment according to FIGS. 9–11 can be slid into the guiding groove only from one side of it, namely the end which facing the observer in FIG. 9. Furthermore it should be pointed out that one of the shoulders in the guiding groove can interact with parts of the sheath body other than just a central button head protrusion of the type described in order to center the cutting part relative to the holder part. In this connection, the shoulder can be positioned other than just in the bottom of the guiding groove A substantial advantage of the tool according to the invention is that the loose top may be clamped and centered in an exact way in the holder part by means of limited deflection motions of the two resilient projections of the holder part. In other words, the risk of plastic deformation in the holder part is minimized. Furthermore, the holder part is not exposed to inconvenient wear or embossing in connection with exchange of loose tops. In this way, it is guaranteed that the holder part can be used for a long time without losing its ability to center the loose top in a predetermined and well-defined way. Furthermore, the tool can transmit large torques between the holder part and the loose top also in those cases when the tool consists of a drill having structure-weakening chip channels. Furthermore, the loose top as well as the holder part may be manufactured in a simple and inexpensive way by means of simple machining operations. The tool can also brought to fulfilment without any tensioning screw as is illustrated in FIGS. 9–11.

FEASIBLE MODIFICATIONS OF THE INVENTION

The invention is not solely limited to the embodiments described above and illustrated in the drawings. Thus, it is feasible to manufacture the sheath body serving as a male member in the form of solely a dovetail-shaped material portion, i.e. without the particular neck portion 18 that has been described above. Furthermore, it is feasible to make the sheath body with an asymmetrical shape, e.g. having only one wedge surface interacting with a corresponding wedge surface in the guiding groove. Furthermore, the clamping device requisite for the deflection of the projections may be made in a way other than in the form of one single double-acting screw. Thus, instead of one screw, two screws may be arranged, one of which deflects the projections 7,8 away from one another, and the other pulls the projections towards one another. It is also feasible to form a double-acting tightening screw in a way other than the above described way.

In the example according to the drawings, the neck portion 18 of the sheath body 14 is shown with the same width as the outer space in the guiding groove 5, i.e. the distance between the flank surfaces 21 is equally large as the distance between the side limiting surfaces 23 when the projections 7,8 are in their tensionless neutral position. However, within the scope of the invention, it is feasible to make the outer space of the guiding groove somewhat thinner than the neck portion 18. Thus, the holder part may be manufactured so that the radial distance between the surfaces 23 is $1/1000$ to $1/100$ shorter than the corresponding radial distance between the flank surfaces 21. In this way, the inherent resilient force in the projections will provide the sheath body with a tensile force, irrespective of the considerable tensile force provided by the tightening screw. This embodiment also improves the automatic centering of the sheath body in relation to the holder part.

Although the limiting surfaces 6A, 6B on both sides of the slot 6 have been shown in the form of plane surfaces, the shape of those surfaces may be modified, for instance in such a way that the contour of the surfaces becomes slightly S-shaped.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Rotatable tool for chip removing machining comprising a holder part mountable in a machine and defining a center axis of rotation, and a replaceable cutting part connected to a front end portion of the holder part by a male/female coupling; the coupling including a seat formed in the front end portion of the holder, and a male member protruding rearwardly from a rear end of the cutting part; a slot formed in the front end portion of the holder part between two resilient projections of the holder part which clamp the male member in the seat; the cutting part including rearwardly facing thrust transmitting surfaces disposed radially outside of the male member; the front end portion of the holder including forwardly facing thrust absorbing surfaces engaging respective ones of the thrust transmitting surfaces; the male member being elongated radially; the seat including a forwardly open, radially extending guiding groove in which the male member is disposed; the guiding groove being open at least at one radial end thereof and configured to permit insertion and removal of the male member in a radial direction and prevent insertion and removal of the male member in an axial direction; the male member including at least one external, substantially planar wedge surface inclined relative to the center axis in a direction having an axially rearward component and a radially outward component; the guide groove including at least one internal, substantially planar wedge surface inclined relative to the axis in a direction having an axially rearward component and a radially outward component; at least one wedge surface of the male member engaging the at least one wedge surface of the guide groove; the cutting part and the holder including mutually engaging first and second centering structures, respectively, for centering the cutting part relative to the holder part; the projections being resiliently movable toward and away from each other for clamping and releasing the cutting part.

2. The rotatable tool according to claim 1 wherein the guiding groove includes internal side limiting surfaces of a symmetrical shape on each side of a central radial plane through the slot; the cutting part including corresponding external side limiting surfaces of a symmetrical shape on each side of a central radial plane through the cutting part.

3. The rotatable tool according to claim 1 wherein the at least one wedge surface of the male member comprises two wedge surfaces defining a dove-tail configuration and forming identical angles relative to the center axis.

4. The rotatable tool according to claim 3 wherein the at least one wedge surface of the guiding groove comprises two wedge surfaces defining a dove-tail configuration and forming identical angles relative to the center axis which are smaller than the angles formed by the wedge surfaces of the male member relative to the center axis.

5. The rotatable tool according to claim 1 wherein the axial thrust transmitting surfaces are rearwardly divergent and form a obtuse angle with one another to urge the projections toward one another.

6. The rotatable tool according to claim 5 wherein each axial thrust transmitting surface engages a respective one of the axial thrust absorbing surfaces to define therewith a pair of surfaces; at least one of those surfaces of the pair being convexly curved, wherein at least one clearance is formed between those surfaces.

7. The rotatable tool according to claim 3 wherein the cutting part includes a neck portion disposed axially between the thrust transmitting surfaces and the wedge surfaces of the male member; the neck including two oppositely facing planar, parallel flank surfaces; the cutting part including two rearwardly facing transverse surfaces extending transversely inwardly from rear ends of respective flank surfaces; a radial distance between the flank surfaces being greater than a maximum radial distance between the wedge surfaces; the guiding groove including two torque-transmitting surfaces extending parallel to respective flank surfaces and clamped thereagainst, and two forwardly facing transverse surfaces extending transversely inwardly from respective side surfaces and spaced axially from the rearwardly facing transverse surfaces.

8. The rotatable tool according to claim 1 wherein the guiding groove is open at both of its ends.

9. The rotatable tool according to claim 1 wherein the guiding groove and the slot are disposed in a common radial plane.

10. The rotatable tool according to claim 1 wherein one of the first and second centering structures comprises a button head protrusion, and the other of the first and second centering structures comprises a countersink receiving the button head protrusion.

11. The rotatable tool according to claim 10 wherein the button head protrusion is formed on a rearwardly facing end surface of the male member; the countersink formed in a bottom of the guiding groove; the button head protrusion being slidable along the bottom to enter the countersink during clamping of the cutting part to the holder part.

12. The rotatable tool according to claim 11 wherein the button head protrusion is symmetrical about an axis thereof and is shallower than the countersink.

13. The rotatable tool according to claim 12 wherein the axis of the button head protrusion coincides with the central axis.

14. The rotatable tool according to claim 10 wherein an outer surface of the button head protrusion engages an inner surface of the countersink along a circumferential line contact.

15. The rotatable tool according to claim 1 wherein one of the first and second centering structures comprises a shoulder upstanding from a surface of the guiding groove, and the other of the centering structures comprises a surface of the male member which abuts the shoulder when the cutting part reaches a centered position on the holder part.

16. The rotatable tool according to claim 1 wherein movement of the projections away from one another widens a space therebetween for receiving the male member.

17. The rotatable tool according to claim 16, further including a double acting screw arranged in the holder part and extending between the projections for flexing the projections toward and away from one another in response to rotation of the screw in first and second directions, respectively.

18. The rotatable tool according to claim 17 wherein the screw comprises a head and a shank having a waist which separates a male thread from a smooth section on the end of which the head is formed, whereby the male thread is in engagement with a female thread in a first of the projections and the smooth section is freely rotatable in a bore in a second of the projections; a washer being applied on the waist through the slot disposed between the projections, whereby the washer is pressed against the second projection during separation of the projections away from each other.

19. The rotatable tool according to claim 17 wherein the screw includes at one end thereof a left-hand threaded male thread in engagement with a female thread formed in one of the projections; and at the opposite end thereof the screw has a right-hand threaded male thread in engagement with a female thread disposed in the other projection.

20. The rotatable tool according to claim 16 wherein the slot includes two opposing surfaces, at least one of the surfaces including a recess sized to receive a turning key for elastically flexing the projections away from one another.

21. A cutting part for a rotatable tool, the cutting part defining a center axis of rotation and including an axially front cutting end and an axially rear mounting end for mounting to a holder part of the tool; the mounting end including a rearwardly projecting male member having at least one wedge surface inclined in a direction having an axially rearward component and a radially outward component; the cutting part further comprising two rearwardly facing axial thrust transmitting surfaces disposed forwardly of the at least one wedge surface and radially outside of the male member; wherein the male member comprises a pair of torque-receiving flank surfaces facing in opposite radially outward directions and situated axially between the at least one wedge surface and the thrust transmitting surfaces; the at least one wedge surface being straight as viewed in a direction parallel to the axis.

22. The cutting part according to claim 21 wherein the at least one wedge surface comprises two wedge surfaces defining a dove-tail shape and inclined at equal angles relative to the axis.

23. Rotatable tool for chip removing machining comprising a holder part mountable in a machine and defining a center axis of rotation, and a replaceable cutting part connected to a front end portion of the holder part by a male/female coupling; the coupling including a seat formed in the front end portion of the holder, and a male member protruding rearwardly from a rear end of the cutting part; a slot formed in the front end portion of the holder part between two resilient projections of the holder part which clamp the male member in the seat; the cutting part including rearwardly facing thrust transmitting surfaces disposed radially outside of the male member; the front end portion of the holder including forwardly facing thrust absorbing surfaces engaging respective ones of the thrust transmitting surfaces; the male member being elongated radially; the seat including a forwardly open, radially extending guiding groove in which the male member is disposed; the guiding groove configured to prevent removal of the male member in an axial direction during a cutting operation; the male member including at least one external, substantially planar wedge surface inclined relative to the center axis in a direction having an axially rearward component and a radially outward component; the guide groove including at least one internal, substantially planar wedge surface inclined relative to the axis in a direction having an axially rearward component and a radially outward component; at least one wedge surface of the male member engaging the at least one wedge surface of the guide groove; the cutting part and the holder including mutually engaging first and second centering structures, respectively, for centering the cutting part relative to the holder part; the projections being resiliently movable toward and away from each other for clamping and releasing the cutting part; wherein the male member comprises a pair of torque-receiving flank surfaces facing in opposite radially outward directions and situated axially between the at least one wedge surface and the thrust transmitting surfaces; wherein the flank surfaces are planar and mutually parallel; the male member including two rearwardly facing transverse surfaces extending transversely inwardly from rear ends of respective flank surfaces; the at least one wedge surface comprising two wedge surfaces forming a dove-tail configuration; a radial distance between the flank surfaces being greater than a maximum radial distance between the wedge surfaces.

24. The cutting part according to claim 21 wherein the flank surfaces are planar and mutually parallel; the male member including two rearwardly facing transverse surfaces extending transversely inwardly from rear ends of respective flank surfaces; the at least one wedge surface comprising two wedge surfaces forming a dove-tail configuration; a radial distance between the flank surfaces being greater than a maximum radial distance between the wedge surfaces.

25. The cutting part according to claim 21 wherein the thrust transmitting surfaces are rearwardly divergent and form an obtuse angle with one another.

26. The cutting part according to claim 22 wherein the male member includes a button head protrusion projecting rearwardly from a rear end of the male member for centering the cutting part on a holding part.

27. The cutting part according to claim 26 wherein the button head protrusion is configured symmetrically about the center axis.

28. A cutting part for a rotatable tool, the cutting part defining a center axis of rotation and including an axially front cutting end and an axially rear mounting end for mounting to a holder part of the tool; the mounting end including a rearwardly projecting male member having at least one wedge surface inclined in a direction having an axially rearward component and a radially outward component; the cutting part further comprising two rearwardly facing axial thrust transmitting surfaces disposed forwardly of the at least one wedge surface and radially outside of the male member; wherein the male member comprises a pair of torque-receiving flank surfaces facing in opposite radially outward directions and situated axially between the at least one wedge surface and the thrust transmitting surfaces; wherein the flank surfaces are planar and mutually parallel; the male member including two rearwardly facing transverse surfaces extending transversely inwardly from rear ends of respective flank surfaces; the at least one wedge surface comprising two wedge surfaces forming a dove-tail configuration; a radial distance between the flank surfaces being greater than a maximum radial distance between the wedge surfaces.

29. A cutting part for a rotatable tool, the cutting part defining a center axis of rotation and including an axially front cutting end and an axially rear mounting end for mounting to a holder part of the tool; the mounting end including a rearwardly projecting male member having at least one wedge surface inclined in a direction having an axially rearward component and a radially outward component; the cutting part further comprising two rearwardly facing axial thrust transmitting surfaces disposed forwardly of the at least one wedge surface and radially outside of the male member; wherein the thrust-transmitting surfaces are rearwardly divergent and form an obtuse angle with one another.

30. Rotatable tool for chip removing machining comprising a holder part mountable in a machine and defining a center axis of rotation and a replaceable cutting part connected to a front end portion of the holder part by a male/female coupling; the coupling including a seat formed in the front end portion of the holder, and a male member protruding rearwardly from a rear end of the cutting part; a slot formed in the front end portion of the holder part between two resilient projections of the holder part which clamp the male member in the seat; the cutting part including rearwardly facing thrust transmitting surfaces disposed radially outside of the male member; the front end portion of the holder including forwardly facing thrust absorbing surfaces engaging respective ones of the thrust transmitting surfaces; the male member being elongated radially; the seat including a forwardly open, radially extending guiding groove in which the male member is disposed; the guiding groove configured to prevent removal of the male member in an axial direction during a cutting operation; the male member including at least one external, substantially planar wedge surface inclined relative to the center axis in a direction having an axially rearward component and a radially outward component; the guide groove including at least one internal, substantially planar wedge surface inclined relative to the axis in a direction having an axially rearward component and a radially outward component; at least one wedge surface of the male member engaging the at least one wedge surface of the guide groove; the cutting part and the holder including mutually engaging first and second centering structures, respectively, for centering the cutting part relative to the holder part; the projections being resiliently movable toward and away from each other for clamping and releasing the cutting part; wherein the male member comprises a pair of torque-receiving flank surfaces facing in opposite radially outward directions and situated axially between the at least one wedge surface and the thrust transmitting surfaces; the at least one wedge surface being straight as viewed in a direction parallel to the axis.

* * * * *